United States Patent [19]

Daniel

[11] Patent Number: 4,606,049
[45] Date of Patent: Aug. 12, 1986

[54] REMOTE TRANSMITTER CONTROL SYSTEM

[75] Inventor: Richard A. Daniel, Kingston, Wash.

[73] Assignee: The United States of America as represented by the Secretary of the Navy, Washington, D.C.

[21] Appl. No.: 677,434

[22] Filed: Dec. 3, 1984

[51] Int. Cl.$^4$ .............................................. H04B 3/36
[52] U.S. Cl. ........................................ 375/45; 375/3; 340/870.18; 179/170 J
[58] Field of Search .................... 375/3, 4, 7, 8, 45, 375/62, 88; 455/7, 9, 14, 20, 23; 370/75; 179/170 R, 170 J; 340/825.05, 870.18

[56] References Cited

U.S. PATENT DOCUMENTS

| | | | |
|---|---|---|---|
| 3,201,691 | 8/1965 | Lyon | 370/75 |
| 3,310,740 | 3/1967 | Leysieffer | 455/23 |
| 3,657,478 | 4/1972 | Andrews, Jr. | 375/7 |
| 3,665,103 | 5/1972 | Watkins | 375/49 |
| 3,772,596 | 11/1973 | Edwards | 375/3 |
| 4,219,891 | 8/1980 | Weiss et al. | 455/23 |

Primary Examiner—Robert L. Griffin
Assistant Examiner—Stephen Chin
Attorney, Agent, or Firm—R. F. Beers; C. D. B. Curry

[57] ABSTRACT

A remote transmitter system including a control station and a remote transmitter station. The control station includes a variable frequency oscillator, a modulator, a parallel to series digital data converter and a DC power supply. The remote transmitter station comprises a power storage circuit, a phase-locked-loop demodulator, a local oscillator, a modulator and a power amplifier. The variable frequency oscillator provides two signals $f_0$ and $f_1$ that are harmonics of each other and are in-phase. These signals modulate the 0's and 1's of digital data that is transmitted along a coaxial cable to the phase-locked-loop demodulator that provides a control signal to the local oscillator and the modulated digital data signal ($f_0$, $f_1$) to the modulator. The local oscillator generates two signals $f_A$ and $f_B$, that have a predetermined phase and/or frequency relationship to $f_0$ and $f_1$. The $f_0$ and $f_1$ signals are detected and applied to the modulator as a control signal ($D_0$, $D_1$) that generates a serial input signal ($f_A$, $f_B$) to the power amplifier and represents the binary data. The invention may be used with either phase modulation, or frequency modulation depending upon the design of the local oscillator. The two outputs $f_A$ and $f_B$ of the modulator can be designed to have any relationship of frequency for frequency modulation or phase for phase modulation.

5 Claims, 2 Drawing Figures

REMOTE TRANSMITTER CONTROL SYSTEM

BACKGROUND OF THE INVENTION

1. Field of the Invention

The present invention relates to a remote transmitter control system and more particularly to a remote transmitter control system that is capable of transmitting digital binary coded data.

2. Description of the Prior Art

The usual method of remotely transmitting binary coded data is to transmit an RF signal down a coaxial cable when the RF signal is frequency or phase modulated to represent the 1's and 0's of the binary logic. The disadvantages of such remote transmission techniques include signal power loss and cross-talk from transmitting highpower signals through cables in proximity with sensor cables.

SUMMARY OF THE INVENTION

It is an object of the present invention to provide a remote transmitter control system for controlling the frequency and digital modulation of a remote transmitter.

Another object of the present invention is to control a remotely located transmitter using a single coaxial cable and simple circuitry.

Still another object of the present invention is to remotely control the transmitter of an acoustic telemetry system where the transmitter is located on the ocean bottom, and is considerably removed from the source of power, data and control.

These and other objects are accomplished by using a control station and a remote transmitter station and the control station includes a variable frequency oscillator, a modulator, a parallel-to-series digital data converter and a DC power supply. The remote transmitter station comprises a power storage circuit, a phase-locked-loop demodulator, a local oscillator, a modulator and a power amplifier. The variable frequency oscillator provides two signals $f_o$ and $f_1$ that are harmonics of each other and are in phase. These signals modulate the 0's and 1's of digital data that is transmitted along a coaxial cable to the phase-locked-loop demodulator that provides a control signal to the local oscillator, and the modulated digital data signal ($f_o$, $f_1$) to the modulator. The local oscillator generates two signals $f_A$ and $f_B$, that have a predetermined phase and/or frequency relationship to $f_o$ and $f_1$. The $f_o$ and $f_1$ signals are applied to the modulator that generates a serial input signal ($f_A$, $f_B$) to the power amplifier that represents the binary data. The invention may be used with either phase modulation, or frequency modulation depending upon the design of the local oscillator. The two outputs $f_A$ and $f_B$ of the modulator can be designed to have any relationship of frequency for frequency modulation or phase for phase modulation.

Other advantages and features will become apparent from the following description of the preferred embodiment when considered in conjunction with the accompanying drawings wherein:

DESCRIPTION OF THE PREFERRED EMBODIMENT

Figure 1:
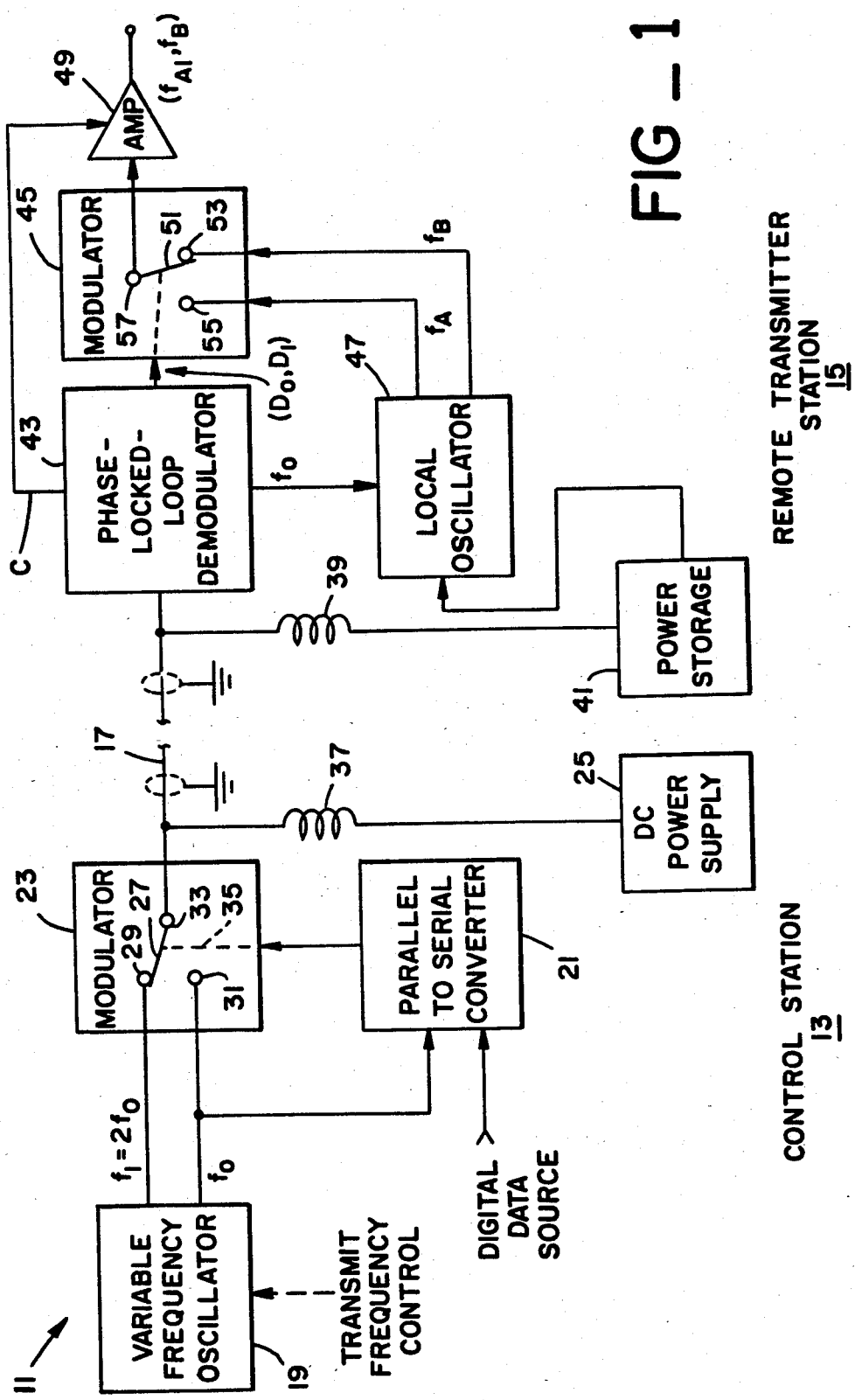
FIG. 1 is a schematic drawing of the remote transmitter control system of the present invention.

The purpose of this invention is to provide a means of remotely controlling frequency and digital modulation of a transmitter using a single coaxial cable and simple circuitry. The usage of this invention has been with underwater acoustic telemetry where the transmitter is located on the ocean bottom, considerably removed from the source of power, data and control. It should be understood that the invention has broad remote control application and is not limited to underwater use.

The remote transmitter control system 11 of the present invention includes a control station 13, which may be shore based, and a remote transmitter station 15, which may be located under water. The electrical signals from the control station 13 are transmitted to the remote transmitter station 15 over a single coaxial cable 17, which may extend several thousand feet and be located under water. The control station includes a variable frequency oscillator 19, a parallel-to-serial digital converter 21, modulator 23 and DC power supply 25. The variable frequency oscillator 19 provides two control signal outputs having frequencies of $f_o$ and $f_1 = 2f_o$ that are exactly in phase and one is the second harmonic of the other. The $f_o$ and $f_1$ signals are applied to the input of modulator 23 the output of which is a serial signal of either $f_o$ or $f_1$ that is in phase with and represents the input signal data. Modulator 23 is a conventional electronic modulator the functional operation of which is shown by switching arm 27, terminals 29, 31 and 33 and control element 35, shown by a dotted line. The $f_o$ output of variable frequency oscillator 19 is also applied in parallel-to-serial converter 21 to provide a reference signal to assure phase lock between the $f_o$ signal and the binary data signal. The $f_1$ signal will be also phase locked to the binary signal since it is in phase with $f_o$.

Figure 2:
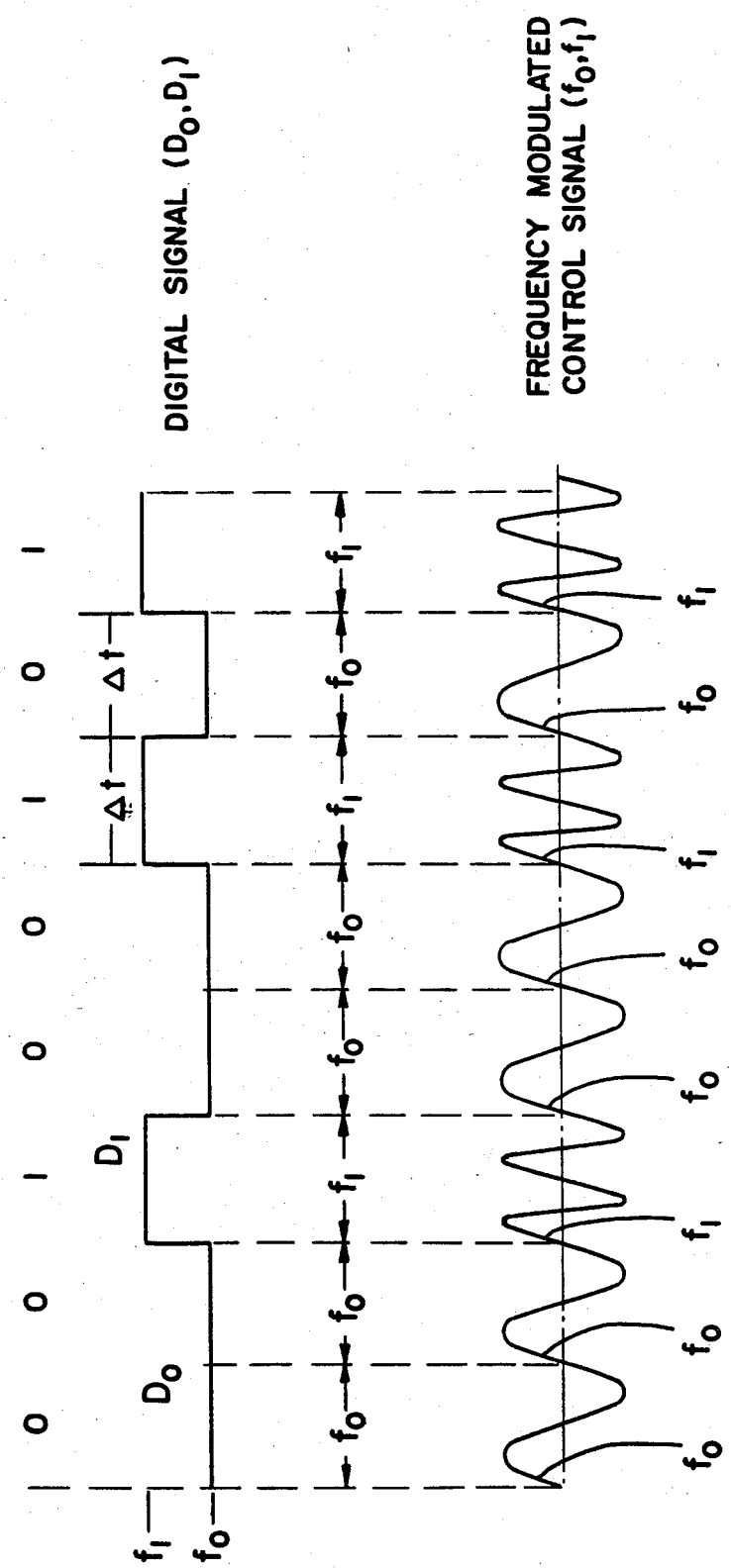
FIG. 2 is a timing diagram showing the relationship between the digital binary signal and the frequency modulated control signal.

In FIG. 2 is shown the relationship between the digital binary signal ($D_o$, $D_1$) and the frequency modulated control signal ($f_o$, $f_1$). It should be noted that the time duration of each bit is $\Delta t$ and that inphase relationships are established as shown by the dotted lines.

Normally raw digital data that may be communicated arrives in parallel format from any of several data sources. If such is the case it is then necessary to convert it to a serial format, as indicated by parallel-to-serial converter 21, to be suitable for serial communication using one channel as shown and described by the present invention. However, if several channels are available then the information could be communicated in parallel using separate FIG. 1 control systems for each channel.

It should be noted that the hereinafter described transmitter frequency can be controlled by controlling the frequency of variable frequency oscillator 19 as indicated by the dotted line. However, if such frequency is varied, it must be kept in phase with the digital binary signal. Change in bit rate or duration $\Delta t$ would also require a change in the control frequencies ($f_o$, $f_1$) and transmission frequencies.

The power from DC power supply 25 is applied through inductor 37 and cable 17 through inductor 39 to power storage circuit 41.

Remote transmitter station 15 includes inductor 39, power storage circuit 41, phase-locked-loop demodulator circuit 43, modulator 45 local oscillator 47 and power amplifier 49. From power storage circuit 41 power is applied to the various components of the remote transmitter station as required. Phase-locked-loop demodulator circuit 43 is tuned to $f_o$, but will phase lock to either $f_o$ or $f_1 = 2f_o$ and outputs $f_o$ to the input of local oscillator 47 and the control signal ($D_{o1}$, $D_1$) to the control input of modulator 45. Modulator 45 is a conventional electronic modulator the functional operation of which is shown by switching arm 51 terminals 53, 55 and 57 and control element 59, shown by the dotted line. It should be noted that the control signal is a dc binary signal that represents the serial binary digital signal (data) ($D_o$, $D_1$) such that $f_o$ represents the low (0's) binary signal and $f_1$ represents the high (1's) binary signals. In this example when $f_o$ is present then $f_A$ is applied to the input of power transmitter 49 and when $f_1$ is present the $f_B$ is applied to the input of power transmitter 49. The demodulator circuit 43 also senses the presence of either $f_o$ or $f_1$ and provides a control signal C that turns on power amplifier 49 when either $f_o$ or $f_1$ are received by the remote transmitter station. In this manner power can be conserved during those times when no messages are being transmitted although DC power may be supplied to keep the system in a ready to transmit state.

The local oscillator 47 is phase locked to $f_o$ and is harmonically related to both $f_o$ and the transmit frequency, or frequencies ($f_A$ and $f_B$). $f_A$ and $f_B$ are in phase with $f_o$ and $f_1$ as well as with the digital signals ($D_o$, $D_1$).

It should be noted that the local oscillator 47 provides two outputs that may be either phase related, or frequency related depending upon whether phase, or frequency modulation is desired for the transmitted signal. The preferred embodiment uses 180° phase modulation so that the two outputs of the local oscillator are equal in frequency, but opposite in phase.

The following is a set of design equations that have been used in practice of the present invention. It is to be understood that other equations and actual values could be used so long as they are compatible with the teachings of the present invention.

| DESIGN EQUATIONS: | | ACTUAL VALUES |
|---|---|---|
| $\Delta t = \leq =$ | length of 1 bit. | 93.3 μsec. |
| $f_o = 1/\Delta t =$ | lowest frequency of two control tones. | 10.714 KHZ |
| $f_1 = 2/\Delta t = 2f_o =$ | upper frequency control tone. | 21.428 KHZ |
| $f_t =$ | transmit frequency. | 75 KHZ |
| $L =$ | number of $f_t$ cycles per bit. | 7 |
| M, N = | any non-zero, positive integers | 7 |
| $f_A =$ | $Nf_o$ | 75 KHZ at 0° |
| $f_B =$ | $Mf_o$ at $<\phi$ | 75 KHZ at 180° |

Where: 0 is phase relationship between $f_A$ and $f_B$

From this it can be seen that the power amplifier 49 of the remote transmitter station 15 transmits a series of modulated pulse bursts ($f_A$, $f_B$) that correspond to the series information provided in the digital data source. This transmitted information may be then received by a tuned received and then decoded to reproduce the digital data source information.

The primary advantages of the invention result from the relatively low power and frequency of the signals required down the cable. So that, for the same transmitted power, a considerably smaller transmitter may be used. Also, cable cross-talk levels are greatly reduced and problems from that cause are effectively eliminated in most applications.

Other advantageous features of the present invention include the relationship between the control frequencies and the transmit frequency that enables the operator to remotely "fine-tune" the transmit frequency to accomplish Doppler compensation and prevent frequency drift. Also the relationship between the control frequencies and the data bit-length, enables digital data to be transmitted over a relatively narrow band of frequencies, compared to that required for digital pulses. Moreover, the combination of electronic circuitry is simple and reliable and provides complete flexibility for control of the transmitter.

The invention may be used with either phase modulation, or frequency modulation, depending upon the design of the local oscillator. The two outputs of modulator 45, $f_A$ and $f_B$, can be designed to have any relationship of frequency for frequency modulation, or phase for phase modulation, bearing in mind that the frequencies $f_A$ and $f_B$ represent the transmitter output corresponding to high and low logic levels of the modulation control data.

What is claimed is:
1. A remote transmitter control system comprising:
   (a) a control station for generating a frequency modulated control signal that represents binary digital data, said control station including
   (1) a variable frequency oscillator, said variable frequency oscillator providing two frequencies $f_0$ and $f_1$ that are harmonically related, in phase and $f_0$ is greater that $f_1$;
   (2) a source of binary digital data;
   (3) a first modulator, said first modulator being responsive to said $f_0$ and $f_1$ frequencies and to said source of binary digital data for generating a frequency modulated control signal wherein $f_0$ and $f_1$ respectively represent the two states of said binary data; and
   (b) a remote transmitter station including a control signal responsive means for receiving said frequency modulated control signal and independently generating a modulated transmission signal that represents said binary digital data, and a transmitter means, said control signal responsive means including
   (1) a local oscillator, the output of said local oscillator being transmit frequencies $f_A$ and $f_B$;
   (2) a second modulator, said second modulator receiving the transmit frequencies $f_A$ and $f_B$ from said local oscillator, the output of said second modulator being applied to the input of said transmitter means; and
   (3) a phase-locked-loop demodulator, said phased-locked-loop demoulator being responsive to said frequency modulated control signal for providing frequency $f_0$ to said local oscillator, providing control signals representing the digital data to said second modulator, and providing a power control signal to said transmitter when transmit frequencies $f_A$ and $f_B$ are present.

2. The system of claim 1 wherein:
(a) said source of binary digital data is responsive to signal $f_0$ and provides binary signals that are in phase with $f_0$ and $f_1$ when modulating said first modulator.

3. The system of claim 2 wherein:
(a) said local oscillator is phase locked to $f_o$.

4. The system of claim 3 wherein:
(a) the outputs $f_A$ and $f_B$ of said local oscillator are in phase and $f_B$ is an integer frequency multiple of $f_A$.

5. The system of claim 4 wherein:
(a) the outputs $f_A$ and $f_B$ of said local oscillator are 180° out of phase with respect to each other and $f_A$ is in phase with $f_o$.

* * * * *